Jan. 23, 1934. J. E. KELLEY 1,944,348
APPARATUS FOR APPLYING STEAM TREATMENTS
Filed July 8, 1932
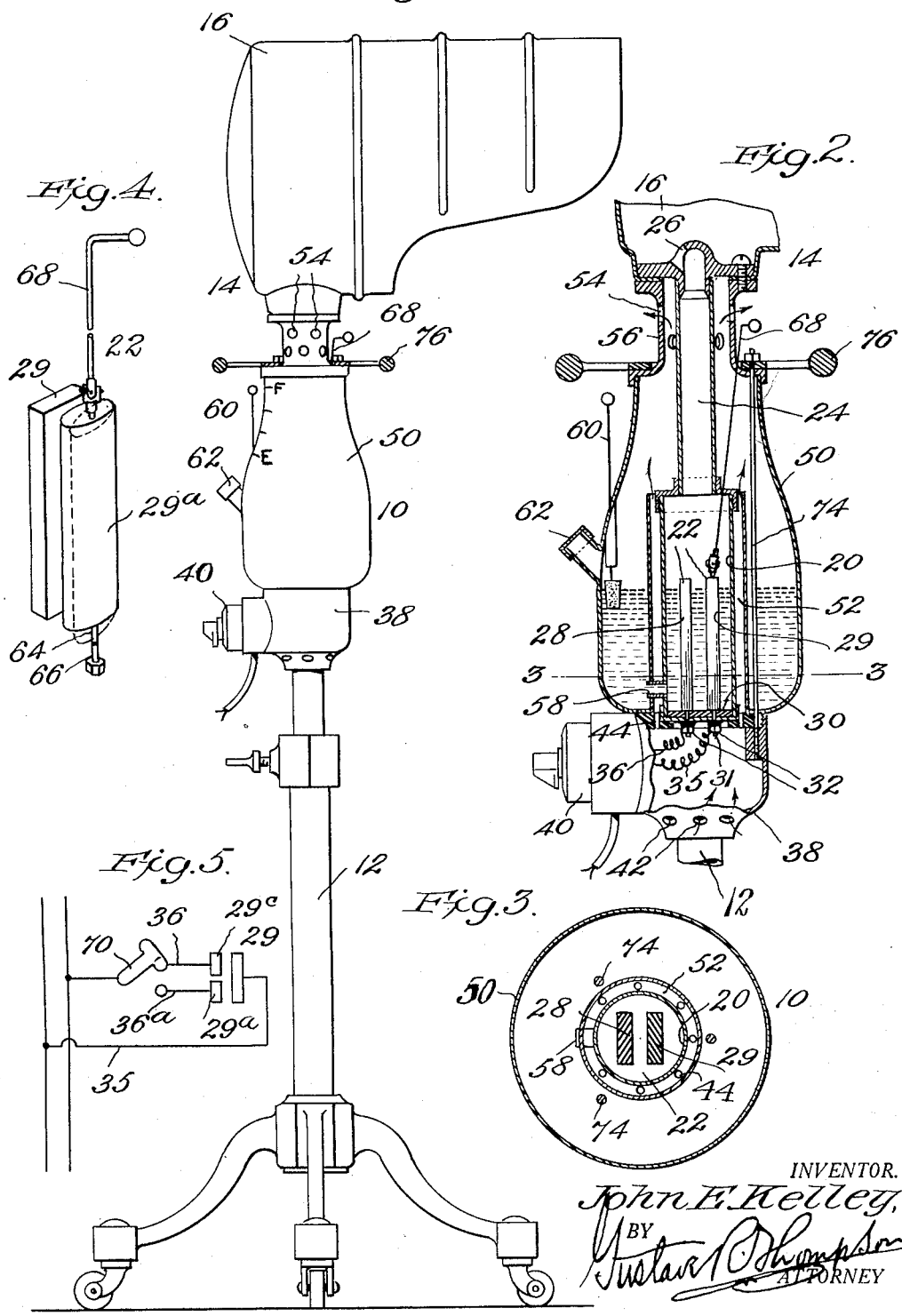
INVENTOR.
John E. Kelley,
BY Patented Jan. 23, 1934

1,944,348

UNITED STATES PATENT OFFICE 1,944,348

APPARATUS FOR APPLYING STEAM TREATMENTS

John E. Kelley, Larchmont, N. Y.

Application July 8, 1932. Serial No. 621,435

11 Claims. (Cl. 219—40)

This invention relates to apparatus for applying so-called steam treatments such as practiced in beauty-parlors, barber-shops, and the like and provides improvements therein. These devices are commonly called "steamers" and will be generally so referred to hereinafter.

Steamers usually comprise a mobile stand having thereon a self-contained steam generator comprising a heating chamber, an electric-heater and a water-reservoir, and a hood into which the steam is discharged. Steamers heretofore in use have had as objections, the burning out of the heater when the water in the heating chamber is exhausted or drops below a certain level, and the scorching or discoloration of decorated parts and causing personal discomfiture because of heat communicated to exterior parts of the apparatus.

The present invention provides a steamer of the character described, in which burning out of the electric heater is avoided, and moreover avoided by very simple, effective and "fool-proof" means.

The invention furthermore provides simple and effective means for preventing destructive and uncomfortable heating of exterior parts of the apparatus, the means including the reservoir.

The invention further provides a simple, compact, durable, and reliable apparatus well-suited to the requirements of use in beauty-parlor establishments and the like.

An embodiment of the invention is illustrated in the accompanying drawing, wherein:—

Figure 1 is a side elevation of the device.

Fig. 2 is a vertical sectional view of the steam generating part of the apparatus.

Fig. 3 is a cross-section on the line 3—3, Fig. 2.

Fig. 4 is a detail view in perspective of a pair of electrodes.

Fig. 5 illustrates diagrammatically another arrangement of the electrodes.

Referring to said drawing, numeral 10 designates the steam generating means, 12 the mobile stand, and 14 the steam outlet head on which there is usually and preferably mounted a hood 16 into which the steam is delivered, and in which the scalp or other part of the person is treated with the steam or the vapor which condenses from the steam.

The steam generating means comprises a heating chamber 20, and 22 designates an electric heater therein. The heating chamber 20 is preferably of relatively small capacity, so that the restricted amount of water contained therein is quickly raised to the steam point by the heat from the electric heater after the current is turned on. A tube 24 rises from the steam chamber 20 to the head 14, and the steam issues through an opening 26 in the head, the length of the tube and the form of the opening being such as to prevent scalding water being carried through the opening 26 by the ebullition in the chamber 20.

The electric heater preferably comprises a pair of spaced electrodes mounted in the chamber 20. The electrodes are preferably supported on a block of insulation 30 in the bottom of the chamber 20, and the lower end of the electrodes may be provided with threaded rods 31 which pass through the insulation 30 and the bottom of the chamber 20, and nuts 32 on the outside end of the threaded rods serve to hold and bind the electrodes to the bottom of the chamber 20. The nuts 32 may also serve for binding the ends of the lead wires 35, 36. The heating chamber 20 may be and preferably is mounted upon a hollow base 38. A switch 40, and the lead wires 35, 36 may be contained in the hollow base. Openings 42 and 44 are preferably provided in the hollow base, through which air may circulate and counteract the heating of the base by the chamber 20. Numeral 50 designates a reservoir for replenishing the water evaporated from the heating chamber 20. The reservoir 50 preferably surrounds the heating chamber 20, and thereby acts as a shield to prevent the exterior parts of the apparatus from being heated to an objectionable or uncomfortable degree. The reservoir 50 is preferably spaced from the heating chamber 20, as indicated at 52, and the openings or ducts 44 in the hollow base 38 preferably lead into this space, and thereby provide for a circulation of air through this space. The space 52 may open into the reservoir above the water level therein, and the air flowing in through space 52 may flow out through holes 54 in a neck 56 connecting the reservoir and the steam outlet head 14. The reservoir 50, as here shown, may be mounted on the base 38 and constitute the support for the steam outlet head 14. Communication between the reservoir 50 and the heating chamber 20 may be effected through a duct 58. The reservoir 50 may be made of any suitable material. It may be made of a tough glass, so that the water level therein may be readily determined at a glance. When made of opaque material, a water-level indicator, such as the float 60, may be provided, for indicating the water-level therein. Numeral 62 designates a filling opening. The built-in reservoir has advantages in simplicity of structure and ease of replenishing the water therein.

Means are preferably provided for varying the heating effect of the electric heater 22. One form of such means is illustrated in Fig. 4. One of the electrodes, as the electrode 29ª, may be provided with an eccentric pintle 64, which pintle 64 may fit into a socket in the block of insulation 30 and bear against a stud 66 connected with the lead wire 35. A rod 68 may be provided by which to turn the electrode 29ª, thereby varying the distance between the electrodes 29 and 29ª, and consequently the amount of current flowing between the electrodes.

Another means of varying the heating effect of the electric heater is illustrated in Fig. 5. Two electrodes 29ᶜ and 29ᵈ may be provided at one side of the circuit, and connected in parallel by lead wires 36, 36ª. A three-position switch 70 may be provided. When the switch 70 is moved from its first or open position to its second position, it connects the electrode 29ᶜ in the circuit, and current flows from this one electrode 29ᶜ to the opposite electrode 29. When the switch 70 is moved to its third position it closes the circuit to both the electrodes 29ᶜ and 29ᵈ, so that current flows in parallel to both electrodes 29ᶜ and 29ᵈ and thence to the electrode 29, thereby increasing the amount of electricity flowing between the electrodes. By moving the electrode 29ª into proximity to the electrode 29, or by connecting both electrodes 29ᶜ and 29ᵈ in circuit, a large amount of electricity is permitted to flow, and a rapid heating of the water thereby effected. This is desirable in quickly bringing the water to the steaming temperature. After the water has been brought to steaming temperature, in order to moderate the generation of steam, the electrode 29ª may be moved further from the electrode 29, or the electrode 29ᵈ may be cut out of circuit, and thereby a diminished amount of electricity allowed to flow.

The construction of electric heaters, in which the electrodes are immersed in the water in the heating chamber, and the circuit completed through the water, has the important advantage of stopping the flow of electricity when the water in the heating chamber 20 falls to a point where the water connection between the electrodes is broken. However, the construction shown and described provides an additional safeguard against the water being exhausted, in that a loud gurgling sound is produced when the water level in the heating chamber becomes low. The construction whereby the flow is automatically stopped when the water becomes low in the heating chamber avoids the objection encountered in other devices of this character, of the burning out of the electric heating element when the water becomes exhausted or excessively low in the heating chamber.

The neck 56 and reservoir 50 may be fastened to the base 38 by means of tie-rods 74, and the upper ends of the tie-rods may pass through a hand-wheel 76 which may be provided for convenience in moving the apparatus around.

The operation of the device has been described in connection with the preceding description of the apparatus.

The invention may receive other embodiments than that herein specifically illustrated and described.

What is claimed is:—

1. An apparatus of the character described, comprising a stand, a water-reservoir, a steam generating chamber in communication therewith, an electric heater in said steam generating chamber, and a steam outlet head, said reservoir joining said stand and outlet head.

2. An apparatus of the character described, comprising a stand, a water-reservoir, a steam generating chamber in communication therewith, an electric heater in said steam generating chamber and a steam outlet head, said reservoir surrounding said heating chamber and joining said stand and outlet head.

3. An apparatus of the character described, comprising a stand, a heating chamber for generating steam thereon, an electric heater in said steam generating chamber, a hollow base for said heating chamber connected to said stand, and openings providing for a circulation of air through said hollow base.

4. An apparatus of the character described, comprising a stand, a heating chamber for generating steam thereon, an electric heater in said steam generating chamber, a hollow base for said heating chamber connected to said stand, a switch and connections to said electric-heater in said hollow base, and openings providing for a circulation of air through said hollow base.

5. An apparatus of the character described, comprising an electric heater and heating chamber, said chamber being of relatively small water capacity so that the heat transmitted to the water therein quickly raises it to steam-temperature, said electric heater comprising a pair of electrodes exposed to the water in said chamber and between which a circuit is established through the water, said circuit being automatically broken when the water in the chamber is evaporated to an extent that the water connection between the electrodes is broken.

6. An apparatus of the character described, comprising an electric heater and heating chamber, said chamber being of relatively small water capacity so that the heat transmitted to the water therein quickly raises it to steam-temperature, said electric heater comprising a pair of electrodes exposed to the water in said chamber and between which a circuit is established through the water, said circuit being automatically broken when the water in the chamber is evaporated to an extent that the water connection between the electrodes is broken, and means for varying the quantity of electricity flowing between said electrodes.

7. An apparatus of the character described, comprising an electric heater and heating chamber, said chamber being of relatively small water capacity so that the heat transmitted to the water therein quickly raises it to steam-temperature, said electric heater comprising a pair of electrodes exposed to the water in said chamber and between which a circuit is established through the water, said circuit being automatically broken when the water in the chamber is evaporated to an extent that the water connection between the electrodes is broken, and means for varying the quantity of electricity flowing between said electrodes, said means comprising a plurality of electrodes in parallel relation.

8. An apparatus of the character described, comprising an electric heater and heating chamber, said chamber being of relatively small water capacity so that the heat transmitted to the water therein quickly raises it to steam-temperature, said electric heater comprising a pair of electrodes exposed to the water in said chamber and between which a circuit is established through the water, said circuit being automatically broken when the water in the chamber is evaporated to an extent that the water connection between the electrodes is broken, and means for varying the quantity of electricity flowing between said electrodes, said means comprising means for varying the proximity of the electrodes.

9. An apparatus of the character described, comprising an electric heater and heating chamber, said chamber being of relatively small water capacity so that the heat transmitted to the water therein quickly raises it to steam-temperature, said electric heater comprising a pair of electrodes exposed to the water in said chamber and between which a circuit is established through the water, said circuit being automatically broken when the water in the chamber is evaporated to an extent that the water connection between the electrodes is broken, and means for varying the quantity of electricity flowing between said electrodes, said means comprising an electrode pivoted eccentrically.

10. An apparatus of the character described, comprising an electric heater and heating chamber, said chamber being of relatively small water capacity so that the heat transmitted to the water therein quickly raises it to steam-temperature, said electric heater comprising a pair of electrodes exposed to the water in said chamber and between which a circuit is established through the water, said circuit being automatically broken when the water in the chamber is evaporated to an extent that the water connection between the electrodes is broken, and a reservoir in communication with said heating chamber.

11. An apparatus of the character described, comprising an electric heater and heating chamber, said chamber being of relatively small water capacity so that the heat transmitted to the water therein quickly raises it to steam-temperature, said electric heater comprising a pair of electrodes exposed to the water in said chamber and between which a circuit is established through the water, said circuit being automatically broken when the water in the chamber is evaporated to an extent that the water connection between the electrodes is broken, said heating chamber having a block of insulation in its bottom-part, said electrodes resting on said insulation, and means passing through the bottom of said chamber and binding said electrodes and insulation to said bottom.

JOHN E. KELLEY.